United States Patent [19]

Seiichi et al.

[11] Patent Number: 4,955,950

[45] Date of Patent: Sep. 11, 1990

[54] FUEL FILL TUBE FOR AUTOMOBILE

[75] Inventors: Takatsuka Seiichi; Sato Kyokuichi, both of Soja, Japan

[73] Assignee: OM Industrial Co., Ltd., Okayama, Japan

[21] Appl. No.: 281,551

[22] Filed: Dec. 8, 1988

[30] Foreign Application Priority Data

Dec. 9, 1987 [JP] Japan .............................. 62-188170[U]

[51] Int. Cl.[5] .............................................. B65D 31/06
[52] U.S. Cl. ............................................ 141/46; 141/59; 141/302; 141/286; 220/85 VR; 220/85 VS; 220/86 R; 137/587
[58] Field of Search ............... 220/85 VR, 85 VS, 86 R; 141/59, 45, 46, 302, 286; 137/587, 588, 589

[56] References Cited

U.S. PATENT DOCUMENTS

| | | | |
|---|---|---|---|
| 4,610,284 | 9/1986 | Bartholomew | 141/302 |
| 4,630,749 | 12/1986 | Armstrong et al. | 220/86 R |
| 4,706,708 | 11/1987 | Fornuto et al. | 141/59 X |
| 4,714,172 | 12/1987 | Morris | 220/86 R |
| 4,724,861 | 2/1988 | Covert et al. | 220/86 R X |
| 4,770,677 | 9/1988 | Harris | 141/45 X |
| 4,809,865 | 3/1989 | Mori et al. | 220/86 R |
| 4,816,045 | 3/1989 | Szlaga et al. | 141/286 X |

FOREIGN PATENT DOCUMENTS 61-125829 8/1986 Japan .
61-127024 8/1986 Japan .

Primary Examiner—Ernest G. Cusick
Attorney, Agent, or Firm—Koda & Androlia

[57] ABSTRACT

In a fuel fill tube for automobiles including an "onboard vapor recovery system", a portion thereof in the vicinity of the fuel fill neck is divided into an upper fill tube and a lower fill tube and a space is provided between the two tubes wherein a vaporized gas recovery system may be provided. Furthermore, a leaded fuel restricting shutter, a vapor discharging valve and other members may be attached to a base provided in the space between the two tubes and can be manufactured as a single unit. In addition, even though the lower fill tube extending from a fuel tank to the fill neck may be formed in a variety of complex configurations in accordance with the kind of automobile to which the fill tube is to be attached, only one version of the upper fill tube is required.

1 Claim, 2 Drawing Sheets

FUEL FILL TUBE FOR AUTOMOBILE

BACKGROUND OF THE INVENTION

1. Field of the Invention

The present invention relates to a fuel fill tube provided with a leaded fuel restricting shutter which opens in the vicinity of a fuel fill neck during supply of fuel, the shutter serving to prevent unleaded fuel from being supplied into a fuel tank by mistake, and to a vaporized gas recovery system with a bypath passageway adapted to prevent fuel vapors in the fuel tank from being discharged into the atmosphere, as well as a valve disc for discharging such vapors. More particularly, the invention relates to an improved fuel fill tube equipped with a so-called "on board vapor recovery system" in which gasoline vapors are processed on the automobile side.

2. Description of the Prior Art

A fuel fill tube for an automobile is provided with various members such as a valve member and a sealing member at a portion thereof in the vicinity of the fuel fill neck and this comprises the "on board vapor recovery system". Examples of such a system are disclosed in Japanese Utility Model Laid-Open No. 61-125829, Japanese Utility Model Laid-Open No. 61-127024 and U.S. Pat. No. 4,630,749. As can be clearly understood from these prior arts, it has recently been common practice to adopt a structure in which fuel vapors are introduced into a carbon canister through a venting circuit specially provided for the purpose of preventing fuel vapors in the tank from polluting the atmosphere when fuel is being supplied into a tank, and it has been the practice in many cases to locate a selective valve for introducing the fuel vapors into the carbon canister in the vicinity of the fill neck. The construction of this kind of automobile fuel fill tube in the vicinity of a leaded fuel restricting shutter is not so simple as that of conventional fuel fill tubes. The structure is complicated and includes various kinds of members which, because they are not easy to attach to the fuel fill tube, inevitably involve certain problems concerning the order of attachment, the difficulty of rust-proof processing, and thermal influence upon and soiling of inner sealing rubbers, plastic members and so on during attachment or finishing processes.

SUMMARY OF THE INVENTION

The present invention is constructed as follows with a view to solving the above-described problems.

That is to say, a fuel fill tube is divided into an upper fill tube and a lower fill tube in the vicinity of the portion thereof where a leaded fuel restricting shutter is provided, which shutter is adapted to open when a fuel fill nozzle is inserted into the neck of the fill tube and to close when the nozzle is removed therefrom. Connecting flange portions are respectively provided on the upper and lower fill tubes. A space for attachment of the leaded fuel restricting shutter, and a sealing member or the like is defined between both connecting flange portions. The attachment space is surrounded by and covered with both connecting flange portions, which are united together by means of a fastener.

The above-mentioned division of the fuel fill tube into the upper fill tube and the lower fill tube means that the fill tube is divided into a base portion and a top portion in the vicinity of the fuel fill neck.

The attachment space is defined between the upper fill tube and the lower fill tube and is wide enough to accommodate the leaded fuel restricting shutter, the sealing member and so on, or some of them. The attachment space accommodates the leaded fuel restricting shutter, which closes the fuel fill neck under the urging force of a spring and opens against the force of the spring when a fuel fill nozzle is inserted, a vapor discharging valve disc which is opened and closed by a valve opening/closing lever which cooperates with the opening/closing movement of the shutter, and a pressure spring for the vapor discharging valve disc.

Connecting flange portions are respectively provided on the base portion side of the upper fill tube and the top portion side of the lower fill tube, each having a diameter larger than that of the fill tube to which they are attached. One of them may be formed with a lid-like configuration and the other formed in the shape of a casing. This allows the connecting flange portions to surround and cover the attachment space for the leaded fuel restricting shutter, the sealing member and the like.

A fastening means such as a bolt, a machine screw or a hook is utilized for the purpose of connecting the upper fill tube to the lower fill tube. This fastening means connects the upper and lower fill tubes at the connecting flange portions thereof by a clamping function or the like.

DETAILED DESCRIPTION OF THE INVENTION

Figure 1:
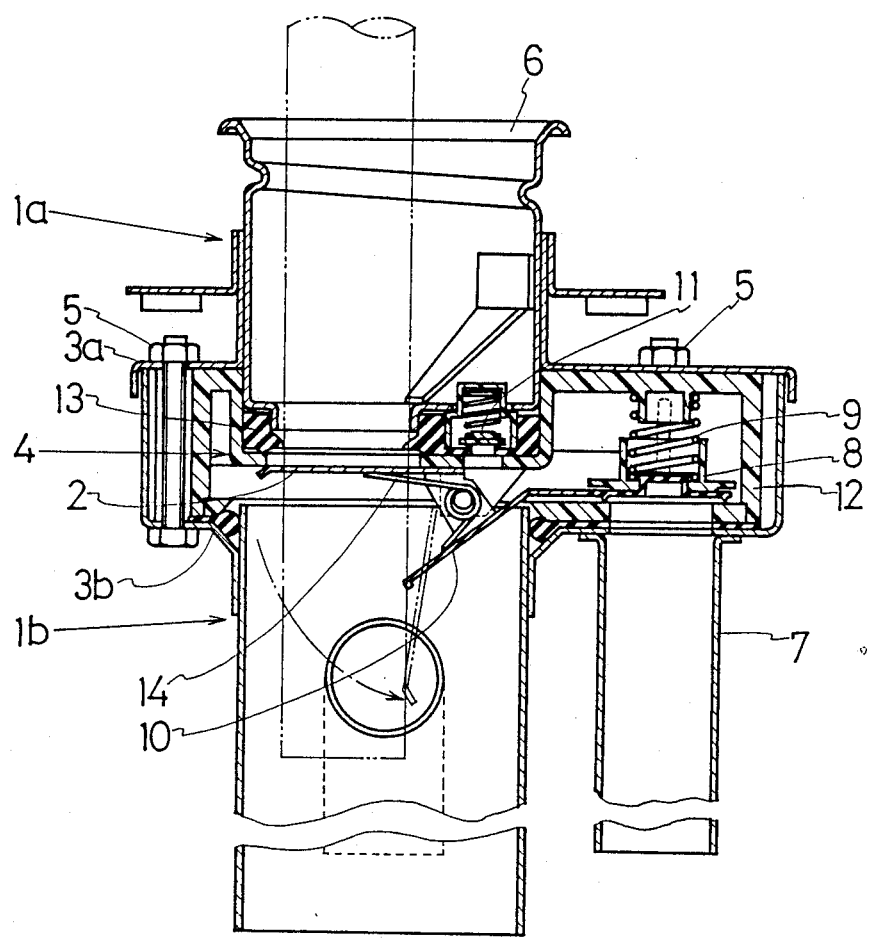
FIG. 1 is a cross-sectional view taken along the line A—A in FIG. 2, showing one preferred embodiment of a fuel fill tube for automobiles according to the present invention.
Figure 2:
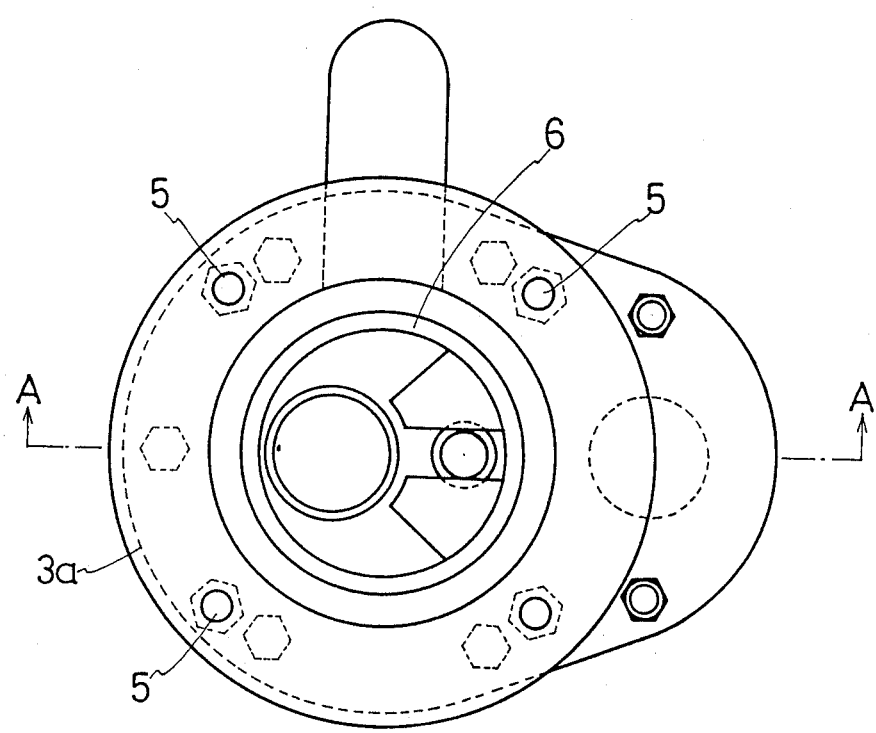
FIG. 2 is a plane view of the same.

One preferred embodiment of a fuel fill tube for automobiles according to the present invention will be fully described hereinafter with reference to FIGS. 1 and 2.

The fuel fill tube for automobiles in this embodiment is a fill tube having a type of vaporized gas recovery system wherein a vapor discharging pipe 7 and a valve disc thereof are provided in the vicinity of a fuel fill neck 6. The vapor discharging valve disc 8 is constructed in such a manner that it is ordinarily biased to the closing side by means of a spring 9 and that it opens upon rotation of a valve opening/closing lever 10 provided coaxially with the vapor discharging valve disc when a leaded fuel restricting shutter 2 is pushed away by a fuel fill gun inserted through the fill neck at the time of fuel supply. A spring 14 is interposed between the leaded fuel restricting shutter 2 and the valve opening/closing lever 10, this spring 14 operating to open the valve opening/closing lever 10. However, since the strength of the pressing force of the spring 9 is designed to be greater than that of the spring 10, the disc opening/closing lever constantly acts to close the valve disc and the pressing force caused by the leaded fuel restricting shutter 2 is also regulated. A relief valve 11 biased by a spring is disposed adjacent to the leaded fuel restricting shutter 2, which is adapted to open automatically and precaution against possible danger when the inner pressure of the fuel tank rises to an extraordinary level. The provision of a sealing function during insertion of the fuel fill gun depends on an annular sealing rubber 13 which is designed to seal off the environment of the gun as in the conventional art.

In the present invention, the above-described mechanism is provided between an upper fill tube 1a and a lower fill tube 1b into which the fill tube is divided in the vicinity of the fuel fill neck. The respective members described above are in the main attached to an easily-attachable plastic base 12 which can be accommodated in an attachment space 4.

The space 4 containing the base to which a plurality of members are attached is surrounded by and covered with an upper connecting flange portion 3a and a lower connecting flange portion 3b respectively provided on the upper fill tube 1a and the lower fill tube 1b. In this embodiment, the upper connecting flange portion 3a is formed into a flat lid-like configuration and the lower connecting flange portion 3b is formed in the shape of a bowl-like casing. The connecting flange portions 3a and 3b can be respectively secured to the upper fill tube 1a and the lower fill tube 1b, either by spot welding or calking or other fastening means such as the nut and bolt combination 5.

This construction is advantageous in that the fuel fill tube in the vicinity of the fuel fill neck can be manufactured separately during production of the fill tube, and in that the upper fill tube 1a can be manufactured in a single version so that it can be secured to various complex versions of the lower fill tube 1b according to the kind of automobile to which the fill tube is to be attached. Furthermore, it is not necessary to define a space for accommodating the shutter member or the like by extending the diameter of the upper portion of the fill tube in the vicinity of the fill neck.

Since the fuel fill tube for automobiles of the present invention is constructed in the above-mentioned manner, one version of the upper fill tube can be put into common use and the lower fill tube can be supplied in various shapes in accordance with the kinds of automobile to which the fill tube is to be attached. It is not necessary to manufacture the upper fill tube in the vicinity of the fill neck as in the conventional art. Also, rust-proof processing can be carried out easily. It is possible to attach inner rubber members and plastic members in the assembly process without any influence from heat, surface processing or dust. Moreover, since these members are covered with a steel member, the fill tube according to the present invention provides resistance to impacts caused by collisions or the like.

What is claimed is:

1. A fuel fill tube for automobiles comprising:
   an upper fill tube attached to a fuel cap;
   an upper connecting flange provided at a lower end of said upper fill tube;
   a lower fill tube attached to a fuel tank;
   a lower connecting flange in the form of a bowl-like casing provided at an upper end of said lower fill tube;
   a bolt and nut means for assembling said upper connecting flange and said lower connecting flange together, said lower connecting flange and upper connecting flange providing an accommodating space therebetween; and
   a vaporized gas recovery unit provided in said accommodating space, said vaporized gas recovery unit comprising a base and a leaded fuel restricting shutter and a vapor discharging or refueling vapor vent valve provided on said base.

* * * * *